(12) United States Patent
Park et al.

(10) Patent No.: US 7,341,779 B2
(45) Date of Patent: *Mar. 11, 2008

(54) RARE EARTH OXIDE COATED PHOSPHORS

(75) Inventors: Wounjhang Park, Dunwoody, GA (US); Kazuhito Yasuda, Kani-Gifu (JP); Brent K. Wagner, Marietta, GA (US); Christopher J. Summers, Dunwoody, GA (US); Youngrag Do, Seoul (KR); Hong Guen Yang, Suwon (KR)

(73) Assignees: Georgia Tech Research Corporation, Atlanta, GA (US); Samsung Display Devices Co., Ltd., Suwan (KR)

(*) Notice: Subject to any disclaimer, the term of this patent is extended or adjusted under 35 U.S.C. 154(b) by 0 days.

This patent is subject to a terminal disclaimer.

(21) Appl. No.: 10/784,093

(22) Filed: Feb. 20, 2004

(65) Prior Publication Data

US 2004/0166318 A1 Aug. 26, 2004

Related U.S. Application Data

(60) Division of application No. 10/458,624, filed on Jun. 11, 2003, now Pat. No. 6,699,523, which is a continuation of application No. 10/134,502, filed on Apr. 30, 2002, now abandoned, which is a division of application No. 09/469,608, filed on Dec. 22, 1999, now abandoned.

(51) Int. Cl.
   *B32B 5/16* (2006.01)

(52) U.S. Cl. ............... 428/403; 428/699; 428/701; 428/704

(58) Field of Classification Search ......... 252/301.4 R, 252/301.6 R, 301.6 S; 428/403, 699, 701, 428/704
See application file for complete search history.

(56) References Cited

U.S. PATENT DOCUMENTS

3,607,371 A 9/1971 Haynes (Continued)

FOREIGN PATENT DOCUMENTS

JP 01-284583 11/1989

OTHER PUBLICATIONS

De Vries et al., "Evaluation of the Energy Migration in GdA13B4012", Jour. Luminescence, vol. 39, No. 3, Jan. 1988, pp. 153-160.

(Continued)

*Primary Examiner*—H. T Le
(74) *Attorney, Agent, or Firm*—Leydig, Voit & Mayer, Ltd.

(57) ABSTRACT

The present invention provides surface coated phosphors useful in field emission displays and vacuum fluorescent displays. The surface coated phosphor comprises a thin coating of rare earth oxide, e.g., yttrium oxide, disposed on an uncoated phosphor such as a sulfide phosphor. The present invention further provides a process for preparing a surface coated phosphor comprising contacting the uncoated phosphor with a rare earth hydroxide gel solution to obtain a rare earth hydroxide gel coated phosphor, drying the gel coated phosphor to remove solvent residues, and heat treating the dried rare earth hydroxide gel coated phosphor. The surface coated phosphors of the present invention have improved cathodoluminescence efficiency, coulombic aging resistance, chemical, and/or oxidative stability.

11 Claims, 1 Drawing Sheet

U.S. PATENT DOCUMENTS

| | | | |
|---|---|---|---|
| 3,619,265 A | 11/1971 | Hammond et al. | |
| 3,639,932 A | 2/1972 | Ferri et al. | |
| 3,717,584 A | 2/1973 | Byler et al. | |
| 3,791,844 A * | 2/1974 | Tecotzky et al. | 428/403 |
| 3,875,449 A | 4/1975 | Byler et al. | |
| 3,953,115 A | 4/1976 | French et al. | |
| 4,208,299 A * | 6/1980 | Oikawa et al. | 252/301.6 S |
| 4,396,863 A * | 8/1983 | Ranby et al. | 313/486 |
| 4,398,119 A * | 8/1983 | Dodds et al. | 313/466 |
| 4,459,507 A * | 7/1984 | Flaherty | 313/489 |
| 4,694,218 A | 9/1987 | Chao | |
| 4,857,395 A | 8/1989 | Benton et al. | |
| 4,952,422 A | 8/1990 | Pappalardo et al. | |
| 5,045,396 A | 9/1991 | Lin et al. | |
| 5,116,637 A | 5/1992 | Baney et al. | |
| 5,118,529 A * | 6/1992 | Klinedinst | 427/213 |
| 5,196,229 A | 3/1993 | Chau | |
| 5,211,733 A | 5/1993 | Fukao et al. | |
| 5,325,016 A | 6/1994 | Srivastava | |
| 5,417,886 A | 5/1995 | Tateiwa et al. | |
| 5,438,234 A * | 8/1995 | Fujino | 313/489 |
| 5,496,427 A | 3/1996 | Gustafson et al. | |
| 5,523,018 A * | 6/1996 | Okada et al. | 252/301.4 P |
| 5,643,674 A | 7/1997 | Bruno et al. | |
| 5,686,022 A * | 11/1997 | Murayama et al. | 252/301.4 R |
| 5,747,100 A | 5/1998 | Petersen | |
| 5,776,368 A | 7/1998 | Chau | |
| 5,856,009 A | 1/1999 | Nishio et al. | |
| 6,004,481 A | 12/1999 | Rao | |
| 6,036,886 A | 3/2000 | Chhabra et al. | |
| 6,077,458 A | 6/2000 | Shiiki et al. | |
| 6,143,200 A | 11/2000 | Akiwa et al. | |
| 6,203,726 B1 | 3/2001 | Danielson | |
| 6,207,077 B1 * | 3/2001 | Burnell-Jones | 252/301.36 |
| 6,261,638 B1 | 7/2001 | van Ooij et al. | |
| 6,364,953 B1 | 4/2002 | Kawakami et al. | |
| 6,366,012 B1 | 4/2002 | Lee et al. | |
| 6,436,313 B1 | 8/2002 | Srivastava et al. | |
| 6,699,523 B2 * | 3/2004 | Park et al. | 427/215 |
| 6,888,302 B2 * | 5/2005 | Juestel et al. | 313/489 |

OTHER PUBLICATIONS

Chemical Abstract citation 1967:416410, abstract for Blasse, "Concentration Quenching of Europium (III) Ion Fluorescence", J. Chem. Phys., vol. 46, No. 7, 1867, pp. 2583-2585.

Kellendonk et al., "Luminescence and Energy Transfer in EuA13B4012", J. Chem. Phys., vol. 75, No. 2, Jul. 1981, pp. 561-571.

U.S. Appl. No. 09/469,607, filed Dec. 22, 1999.

U.S. Appl. No. 09/469,315, filed Dec. 22, 1999.

Korean Intellectual Property Office, Notice to Submit Response in Counterpart Korean Application No. 10-2000-0056809, dated Apr. 17, 2007.

Korean Intellectual Property Office, Notice to Submit Response in Counterpart Korean Application No. 10-2000-0056809 (Oct. 30, 2006).

Park, W. et al., "Uniform and continuous $Y_2O_3$ coating on ZnS phosphors," Materials Science and Engineering B76 (2000) 122-126.

* cited by examiner

RARE EARTH OXIDE COATED PHOSPHORS

CROSS-REFERENCE TO RELATED APPLICATIONS

This is a divisional of U.S. patent application Ser. No. 10/458,624, filed Jun. 11, 2003, now U.S. Pat. No. 6,699,523, which is a continuation of U.S. patent application Ser. No. 10/134,502, filed Apr. 30, 2002, now abandoned, which is a divisional of U.S. patent application Ser. No. 09/469,608, filed Dec. 22, 1999, now abandoned, the disclosures of the '624, '502 and '608 applications are incorporated by reference.

FIELD OF THE INVENTION

The present invention generally relates to rare earth oxide coated phosphors useful in field emission display devices and vacuum fluorescent display devices and a process for preparing the coated phosphors, and particularly, to rare earth oxide coated sulfide phosphors having improved cathodoluminescence properties and a process for preparing them.

BACKGROUND OF THE INVENTION

The operating characteristics of field emission displays (FED) and vacuum fluorescent displays (VFD) place many demands upon cathodoluminescent phosphors. In particular, the lower operating voltages used in FEDs compared to cathode ray tubes (CRT) result in smaller penetration depths and reduced luminous efficiency and brightness. This reduction in luminous efficiency can be compensated for by using higher drive currents or current densities and taking advantage of the longer pixel dwell time (e.g., 30 μs) used in FEDs.

However, the use of higher current densities accelerates coulombic aging, e.g., degradation by electron bombardment, as well as degradation of the phosphor by interactions with the residual atmosphere in the vacuum devices. The phosphor degradation can lead to poisoning of the field emission cathodes. Further, since low voltages are employed, operation of the device becomes especially challenging in view of the resistance produced by contaminations such as the surface dead layer. The foregoing shows that there exists a need for low voltage phosphors having both high efficiency and chemical stability.

Furthermore, the phosphors undergo a baking process during the manufacture of VFDs and FEDs during which the surface of the phosphor is oxidized to some extent. The oxidation causes deterioration of the crystallinity of the phosphor surface, and consequently, the oxidized surface decomposes or degrades during operation of the devices. In addition, certain phosphors, e.g., as sulfide phosphors, undergo an electron stimulated decomposition which generates gases such as gases containing S, SO, and/or $SO_2$. These gases are harmful, and they can reduce the electron emission efficiency of the cathode. Thus, there further exists a need for phosphors, particularly sulfide phosphors, that have increased resistance to oxidative and/or electron stimulated decomposition.

These and other advantages of the present invention, as well as additional inventive features, will become apparent from the description of the present invention provided herein.

BRIEF SUMMARY OF THE INVENTION

Many of the foregoing needs have been fulfilled by the present invention which provides a surface coated phosphor comprising a thin coating of a rare earth oxide disposed on an uncoated phosphor. The present invention further provides a process for preparing the coated phosphor comprising contacting the uncoated phosphor with a rare earth hydroxide gel solution to obtain a rare earth hydroxide gel coated phosphor and heat treating the rare earth hydroxide gel coated phosphor.

While the invention has been described and disclosed below in connection with certain embodiments and procedures, it is not intended to limit the invention to those specific embodiments. Rather it is intended to cover all such alternative embodiments and modifications as fall within the spirit and scope of the invention.

DETAILED DESCRIPTION OF EMBODIMENTS

Figure 1:
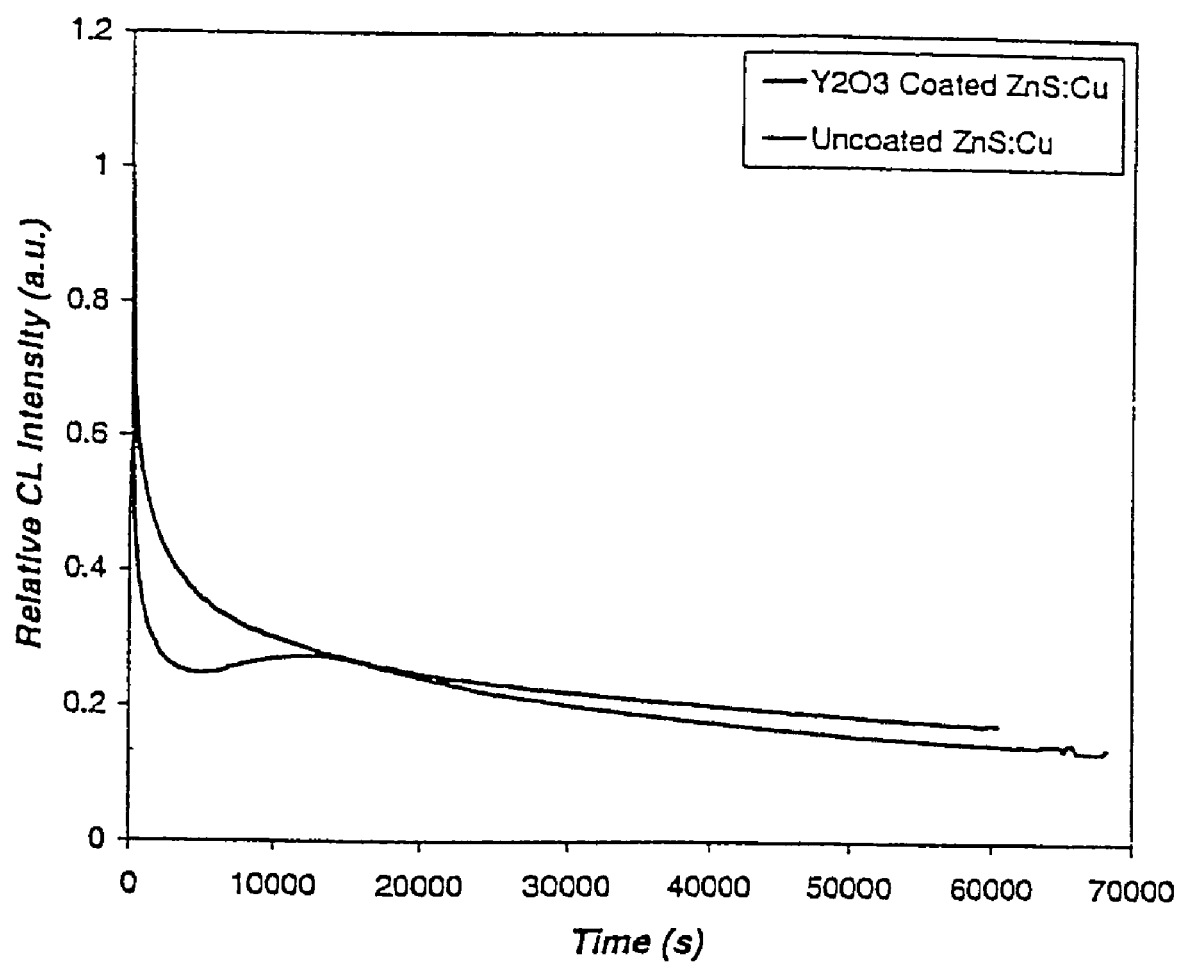
FIG. 1 depicts the relative cathodoluminescence efficiency as a function of aging time under a pulsed electron beam for an uncoated ZnS:Cu phosphor and the phosphor coated with $Y_2O_3$ in accordance with an embodiment of the present invention.

The present invention provides a surface coated phosphor having one or more advantages such as improved cathodoluminescence efficiency, improved aging resistance, oxidative stability, and chemical stability. The surface coated phosphor of the present invention find use in FEDs and VFDs. The surface coated phosphors of the present invention combine the advantageous chemical and/or oxidative stability of rare earth oxides and the luminescent properties of the phosphors. The rare earth oxide coating protects the surface of the phosphor against chemical and oxidative degradation. The rare earth oxide coating also passivates the surface of the phosphor, for example, prevents formation of recombination centers.

The rare earth oxides have large electron penetration depths, e.g., $Y_2O_3$ has an estimated penetration depth of 12 nm under a 2 kV accelerating voltage. As the phosphors, particularly sulfide phosphors, also have large penetration depths, e.g., ZnS has a penetration depth of 35 nm under a 2 kV accelerating voltage, the rare earth oxide coated phosphors are attractive for use in FEDs and VFDs. The surface coated phosphors of the present invention do not easily degrade or release harmful gases such as S, SO, and/or $SO_2$.

The surface coated phosphor of the present invention comprises a thin coating of rare earth oxide disposed on an uncoated phosphor. The uncoated phosphor can be any suitable phosphor, for example, a sulfide or an oxide phosphor. An example of a sulfide phosphor is a zinc sulfide based phosphor such as ZnS:Cu; ZnS:Cu,Al; and (Zn,Cd)S:Ag,Al, or combinations thereof.

The surface coating can be made of any suitable rare earth oxide, e.g., an oxide of yttrium, scandium, of a lanthamide, or combinations thereof. Examples of rare earth oxides include $Gd_2O_3$, $Yb_2O_3$, and preferably $Y_2O_3$.

The uncoated phosphor can be of any suitable shape. For example, the uncoated phosphor can be a powder having a particle of size of from about 0.01 μm to about 5 μm or larger. The coating of rare earth oxide can have any suitable thickness, typically greater than 1 nm, preferably from about 10 nm to about 1000 nm, and in some embodiments greater than about 1000 nm.

The present invention provides a process for preparing a surface coated phosphor comprising a thin coating of a rare earth oxide disposed on an uncoated phosphor, the process comprising contacting the uncoated phosphor with a rare earth hydroxide gel solution to obtain a rare earth hydroxide gel coated phosphor, drying the rare earth hydroxide gel coated phosphor to obtain a dried rare earth hydroxide gel coated phosphor, and heat treating the dried rare earth hydroxide gel coated phosphor. In a preferred embodiment, the present invention provides a process for preparing a surface coated phosphor comprising a thin coating of rare earth oxide disposed on an uncoated phosphor comprising:

(a) preparing a solution of a rare earth alkoxide in a medium comprising an organic solvent and water;

(b) heating the solution from (a) to hydrolyze the rare earth alkoxide to obtain a solution containing rare earth hydroxide gel;

(c) contacting the uncoated phosphor with the solution obtained in (b) to obtain a gel coated phosphor;

(d) drying the gel coated phosphor; and (e) heat treating or firing the dried phosphor obtained in (d).

The rare earth hydroxide solution can be prepared by any suitable method, for example, by dissolving a precursor of the rare earth oxide in a medium comprising an organic solvent followed by the addition of water to the solution. Alternatively, the precursor can be dissolved in a medium containing an organic solvent and water.

Any suitable precursor, for example, a rare earth compound, preferably a rare earth organic compound which eventually provides a rare earth oxide, can be used. It is further preferred that any residue formed from the rare earth compound is easily removable, e.g., by evaporation or oxidation, from the rare earth oxide. A preferred organic compound is rare earth alkoxide. Any suitable rare earth alkoxide can be used, preferably an alkoxide that provides high hydrolysis rates to form the hydroxide gel, for example, $C_1$-$C_8$ alkoxides, preferably $C_1$-$C_4$ alkoxides, and more preferably $C_2$-$C_4$ alkoxides. In certain embodiments of the present invention, an isopropoxide is used. Yttrium isopropoxide is an example of a preferred precursor.

The dissolution medium can include any suitable solvent or mixture of solvents. For example a mixture of polar and nonpolar solvents can be employed. Suitable nonpolar solvents include hydrocarbons, e.g., aromatic hydrocarbons including toluene. Suitable polar solvents include alcohols, e.g., ethanol, isopropanol, or butanol, and ketones, e.g., acetone and methyl ethyl ketone. The medium preferably includes a mixture of toluene and an alcohol or ketone. Preferred solvent mixtures include toluene and a polar solvent such as isopropanol or acetone.

The solvent mixture can have any suitable proportion of nonpolar and polar solvents. For example, the nonpolar solvent and the polar solvent can be present in a volume ratio of from about 20:80 to about 80:20, preferably from about 40:60 to about 60:40, and more preferably from about 45:55 to about 55:45. In accordance with certain embodiments of the present invention, the nonpolar solvent and the polar solvent can be present in a volume ratio of 50:50.

The precursor can be dissolved in the medium in an amount to provide the desired rare earth oxide concentration. The concentration of the precursor dissolved is typically greater than 0.1% by weight, e.g., from about 0.5% to about 5.0% by weight, preferably from about 0.5% to about 2.0% by weight, and more preferably about 1.0% by weight of the solution.

The rare earth metal present in the precursor solution is then treated so that the metal is ionized and hydrated. This can be accomplished by hydrolyzing the precursor. Hydrolysis of the precursor can be carried out by methods known to those skilled in the art, for example, by contacting the precursor solution with water or an aqueous base. For example, water or a base can be added to the precursor solution and heated, preferably with vigorously stirring of the solution.

Examples of suitable bases include ammonia or ammonium hydroxide and urea. As urea releases ammonia when heated in aqueous medium, it provides a convenient way of supplying ammonia to the solution. The addition of urea reduces the formation of momentary regions of high pH that may be encountered in direct addition of a base. High pH conditions are preferably avoided since they may cause homogeneous nucleation of the hydrated rare earth cation.

To carry out the hydrolysis reaction, water is preferably used in an amount that is in excess relative to the rare earth oxide. Thus, for example, the molar ratio of water to the precursor can be greater than about 10:1, preferably greater than about 100:1, and more preferably from about 100:1 to about 300:1.

The hydrolysis reaction can be accelerated by heating the precursor solution. For example, the precursor solution can be heated at a temperature of from about 40° C. to about 100° C., and preferably from about 50° C. to about 80° C. In certain embodiments, the solution is heated at the solvent reflux temperature. Heating is carried out until the hydrolysis is substantially or preferably fully completed. As the rate of hydrolysis increases with temperature, the heating period will depend upon the temperature. The higher the temperature, the shorter the heating time. The solution can be heated for a period of greater than about 0.1 hour, e.g., for a period of from about 1 hour to about 72 hours, preferably from about 10 hour to about 30 hours, and more preferably for about 20 hours, at the above temperature ranges, and preferably at 65° C.

The pH of the solution containing the rare earth hydroxide plays an important role in the quality of the coating ultimately obtained. Particularly, it has been found that a heterogeneous nucleation of the rare earth hydroxide is desirable to obtain a thin, smooth and continuous coating, and that such a nucleation can be achieved by keeping the hydroxide solution, for example, at a pH of from about 4.0 to about 10.0, preferably from about 6.0 to about 8.0 and more preferably at about 7.5. At low pH conditions, e.g., below about 4.0, the hydrolysis rate of the alkoxide tends to be low. The coating thickness also tends to diminish under these low pH conditions.

After the hydrolysis reaction is completed, the phosphor is contacted with the rare earth hydroxide gel solution. The contacting can be carried out by stirring the phosphor particles into the solution. The gel coated particles are separated from the gel solution, e.g., by filtration or decantation.

The gel coated phosphor particles are first dried to remove the adsorbed solvents. For example, the particles can be dried at the ambient temperature (22±3° C.) or at a moderately higher temperature. Thus, the drying can be carried out at a temperature, e.g., at about 30° C. or higher, such as from about 60° C. to about 150° C., and preferably at a temperature of from about 80° C. to about 120° C. The drying can be carried in a suitable atmosphere, e.g., in air, vacuum, or in the presence of a gas such as an inert gas.

The dried gel coated phosphor particles are then heat treated or fired at a higher temperature. This heat treatment increases the bonding of the gel to the phosphor particles. The temperature at which the heat treatment is carried out can be about 200° C. or higher, e.g., from about 225° C. to about 500° C., preferably from about 250° C. to about 450° C., and more preferably from about 300° C. to about 400° C.

The heat treatment can be carried out in a suitable atmosphere, e.g., in air, vacuum, or in the presence of a gas such as an inert gas. Heat treatment in an oxidizing atmosphere, e.g., in air is preferred since under these conditions, any carbon residues are burned off. In accordance with certain embodiments of the present invention, at the higher temperatures, e.g., about 300° C., the bonding between the gel and particle increases. At higher temperatures, the gel undergoes certain physical or morphological changes such as densification and/or crystallization of the gel into an oxide.

The surface coated phosphors of the present invention are free or substantially free of bridging or agglomeration between the particles. If desired, the coating can be further refined by suitable post-treatment. For example, any crack in the coating can be healed or any broken bridge area can be rounded off by increasing the heat treatment temperature. Up to the termination of the of crystallization range, heat treatment causes the coatings to become more uniform.

The surface coated phosphors of the present invention have improved cathodoluminescence (CL) efficiency relative to the uncoated phosphor. For example, the CL efficiency is higher than the uncoated phosphor up to about 10% or more at 1 kV. The surface coated phosphors of the present invention show improved stability to the intense electron bombardment as well as chemical and oxidative stability. The protective coating reduces the thickness of the surface dead layer.

The following illustrative examples further illustrate the present invention but, of course, should not be construed as in any way limiting its scope.

EXAMPLE 1

This Example illustrates a method of preparing an yttrium oxide coated phosphor in accordance with an embodiment of the present invention.

Yttrium isopropoxide was first dissolved in a 50:50 by volume mixture of toluene/isopropanol solution. Water was then added with mixing to the isopropoxide solution to achieve a water-to-yttrium isopropoxide molar ratio of 200:1. The resulting solution was refluxed at 65° C. for 20 hours to completely hydrolyze the isopropoxide. The amount of yttrium isopropoxide was chosen so as to provide ultimately a $Y_2O_3$ coating of 1.0% by weight of the phosphor. The pH of the solution was 7.5. ZnS:Cu phosphor particles were added to the solution, stirred, and the coated phosphor particles were isolated and dried in air. The coated phosphor particles were then fired in air at 400° C. for 1 hour. The resulting coated phosphor particles had a continuous, smooth, and uniform coverage.

EXAMPLE 2

This Example illustrates an advantage of the coated phosphor in accordance with an embodiment of the present invention.

The coated phosphor particles prepared as in Example 1 were tested for cathodoluminescence (CL) properties. Coated and uncoated phosphor screens were made with a screen weight of 2 mg/m². As shown in FIG. 1, the $Y_2O_3$ coated phosphor exhibited an improved aging behavior compared to the uncoated phosphor. After 60,000 seconds of aging under a pulsed electron beam, the coated phosphor has a CL efficiency of about 10% higher than the uncoated phosphor.

While this invention has been described with emphasis upon a preferred embodiment, it will be obvious to those of ordinary skill in the art that the described product or process may be varied. It is intended that the invention may be practiced otherwise than as specifically described herein. Accordingly, this invention includes all modifications encompassed within the spirit and scope of the following claims.

What is claimed is:

1. A surface coated phosphor comprising an uncoated sulfide or oxide phosphor and a layer of continuous uniform coating comprising a crystalline rare earth oxide disposed on the uncoated phosphor having a thickness ranging from 1 nm to about 1000 nm, wherein the surface coated phosphor is configured as a coating in a display device.

2. The surface coated phosphor of claim 1, wherein said uncoated phosphor is a sulfide phosphor.

3. The surface coated phosphor of claim 2, wherein said sulfide phosphor is a ZnS based phosphor.

4. The surface coated phosphor of claim 3, wherein said ZnS based phosphor is selected from the group consisting of ZnS:Cu; ZnS:Cu,Al; (Zn,Cd)S:Ag,Al; and combinations thereof.

5. The surface coated phosphor of claim 4, wherein said ZnS based phosphor is ZnS:Cu.

6. The surface coated phosphor of claim 1, wherein said rare earth oxide is $Y_2O_3$.

7. The surface coated phosphor of claim 1, wherein the continuous uniform coating has a thickness of from 1 nm to about 50 nm.

8. A surface coated phosphor consisting of an uncoated sulfide or oxide phosphor and a layer of continuous uniform coating comprising a crystalline rare earth oxide disposed on the uncoated phosphor having a thickness ranging from 1 nm to about 1000 nm, wherein the surface coated phosphor is configured as a coating in a display device.

9. A surface coated phosphor comprising an uncoated sulfide or oxide phosphor and a layer of continuous uniform coating comprising crystalline $Y_2O_3$ disposed on the uncoated phosphor having a thickness ranging from 1 nm to about 1000 nm, wherein the surface coated phosphor is configured as a coating in a display device.

10. A surface coated phosphor comprising an uncoated sulfide or oxide phosphor and a layer of continuous uniform coating comprising crystalline $Y_2O_3$ disposed on the uncoated phosphor having a thickness ranging from 1 nm to about 1000 nm, wherein the surface coated phosphor is configured as a coating in a display device, and the layer of continuous uniform coating comprising crystalline $Y_2O_3$ passivates the surface of the phosphor.

11. A method of increasing the luminescence efficiency of a luminescent sulfide or oxide phosphor comprising providing a layer of continuous uniform coating comprising crystalline $Y_2O_3$ on the phosphor having a thickness ranging from 1 nm to about 1000 nm.

* * * * *